United States Patent [19]

Jørgensen

[11] Patent Number: 4,614,591

[45] Date of Patent: Sep. 30, 1986

[54] METHOD TO PURIFY WATER

[75] Inventor: Sven E. Jørgensen, Vaerløse, Denmark

[73] Assignee: SRS Water Research Corporation AB, Stockholm, Sweden

[21] Appl. No.: 679,046

[22] PCT Filed: Apr. 5, 1984

[86] PCT No.: PCT/SE84/00122

§ 371 Date: Dec. 5, 1984

§ 102(e) Date: Dec. 5, 1984

[87] PCT Pub. No.: WO84/03881

PCT Pub. Date: Oct. 11, 1984

[30] Foreign Application Priority Data

Apr. 6, 1983 [SE] Sweden .................................. 8301888

[51] Int. Cl.$^4$ .............................................. B01J 47/04
[52] U.S. Cl. ....................................... 210/669; 210/686; 210/502.1; 210/503; 502/62
[58] Field of Search ............... 210/663, 669, 679, 686, 210/290, 681, 502.1, 503, 505; 502/62; 521/28

[56] References Cited

U.S. PATENT DOCUMENTS

| 3,723,308 | 3/1973 | Breck | 210/681 |
| 3,985,648 | 10/1976 | Casolo | 210/686 |
| 4,198,326 | 4/1980 | Lishevskaya et al. | 210/681 |
| 4,344,851 | 8/1982 | Sherman et al. | 210/681 |

Primary Examiner—Ivars Cintins
Attorney, Agent, or Firm—Cushman, Darby & Cushman

[57] ABSTRACT

The present invention relates to a method of purifying water for fish-breeding, according to which the water is optionally subjected to sedimentation, is subjected to sand filtration and to oxygenization, and to which the water also is subjected to a treatment with an ion exchanger mixture consisting of 40 to 70 percent clinoptilolite, 30 to 15 percent anion exchanger and 30 to 15 percent cation exchanger, the two latter being of cellulose type. The invention relates furthermore to the ion exchanger mixture mentioned.

5 Claims, No Drawings

METHOD TO PURIFY WATER

The present invention concerns a method to purify water for fish-breeding, in which the water optionally is subjected to sedimentation, subjected to sand filtration and to oxygenation and in which the water is also subjected to a treatment with a special ion-exchanger mixture consisting of clinoptilolite, an anion exchanger and a cation exchanger, the two latter being of cellulose type. The invention relates further to the mentioned ion-exchanger mixture, which do not need to be regenerated.

The world demand for animal protein has strongly increased during the last decades and in order to satisfy this increase an ever higher extent of fish protein has been used. This has i.a. resulted in a strong expansion of the sea fishing to reach a peak in the beginning of the seventies. At that time one had realized which large risks the extensive increase of the sea fishing meant for the existence of the fish, for which reason certain fishing restrictions were introduced. From that time on the interest for intensive fish-breeding has increased and the reason hereto is i.a. a more and more severe shortage of animal protein.

Fish-breeding in dams and in net compartments in lakes and in the sea has been practised during a long period of time. Such breeding is however exposed to the temperature changes of the seasons. This is inconvenient as the temperature has a great importance for the rate of growth of the fish and thereby for the production capacity of the breeding and to eliminate this inconvenience and to obtain as good growth of the fish as possible an optimal temperature during the whole year is sought (e.g. for salmon fish this temperature is about 16° C.

Besides the water temperature, the oxygen content and the concentration of ammonia in the water are two important factors affecting the rate of growth of fishes.

To eliminate the inconveniences of the temperature variations the fish-breeding can be performed in completely closed water systems, which are thermally insulated against the environment and in which the temperature is regulated by thermal relays to achieve an optimum temperature. In such closed systems the water is led from the breeding tank to a purification plant, in which the oxygen content and the concentration of ammonia in the water are adjusted before it is recirculated to the breeding tank.

In purification plants hitherto there have been practised mechanical-biological purification methods of the same type as those used for sewage water from households. The demands of purification comprise (a) a reduction of the biological oxygen demand (BOD), i.e. a removal of organic substances and (b) a removal or reduction of the concentration of ammonia ($NH_3$ and $NH_4^+$).

The concentration of ammonia is essential in this context because ammonia is a residual product of the digestion of the fishes, but at the same time represents a poison for the fishes. Non-ionized ammonia ($NH_3$) inhibits the growth already at a concentration of 0.025 mg/ml. This implies that with a pH of 8.3 the concentration of $NH_3+NH_4^+$ of 0.25 mg/l inhibits the growth, and with a pH of 7.3 the growth inhibition concentration of $NH_3+NH_4^+$ is 2.5 mg/l. This is evident from the following equation:

$$pH = pK + (NH_3/NH_4^+)$$

pK = —log for the equilibrity constant of the equation $$NH_4^+ \rightleftharpoons H^+ + NH_3$$

pK = 9.3 at ambient temperature (about 15°–20° C.).

With the application of hitherto known methods for mechanical-biological purification the oxygen demand ($BOD_5$) is reduced by about 90 percent, when the purification plant is correctly dimensioned. Furthermore the ammonia/ammonium ought possibly to be nitrified to nitrate, which the fish can endure in concentrations of 100–200 mg N/l.

The inconvenience of using known mechanical-biological purification methods for fish-breeding in closed water systems, in which the water is only slightly polluted, are that the purification becomes too expensive as the water quantities are very large and because it is difficult to obtain the necessary efficiency, as the water to be purified remains for almost the same period of time in the purification plant as in community plants, in which the pollution is considerably larger both in $BOD_5$ and contents of ammonia/ammonium.

Various methods and means for water purification have been described. The published Swedish patent application 16494/71 describes a proceeding for purification of sewage water by a treatment with i.a. a mixture of 25 to 75 percent of a cation exchanger of cellulose type and 75 to 25 percent zeolite. It has also been known to remove organic compounds and ammonia from sewage water with the aid of an anion exchanger and clinoptilolite, see e.g. Water Research, vol. 10 (1976), No. 3, pages 213 to 224 and Techniques et Sciences Municipales et Revue l'Eau, June 1979, No. 6, pages 355 to 359.

A common inconvenience for all these known methods, in which ion exchangers are used, is that the ion exchanger, either it is used as such or in mixture, has to be regenerated after a certain time. The inconveniences with this are evident, especially in fish-breeding in closed systems. When the ion exchanger is regenerated it has to be replaced by a new one for achieving the desired purification. With negligence in the elution of the ion exchanger after the regeneration itself the regeneration fluid can by mistake remain in the ion exchanger (in many cases a relatively strong alkaline fluid), which results in fatal consequences for the fish-breeding system.

It has surprisingly turned out that an ion exchanger mixture consisting of 40 to 70 percent clinoptilolite, 30 to 15 percent anion exchanger and 30 to 15 percent cation exchanger, the two latter being of cellulose type, do not need to be regenerated, on account of which very good growth rates for fish are obtained, if the water, in which the fish-breeding takes place, besides a filtration by sand filter and oxygenization also is purified by a treatment with this ion exchanger mixture.

The present invention concerns a method to purify water for fish-breeding according to which the water optionally is subjected to sedimentation, is subjected to sand filtration and to oxygenization, and according to which the water is also subjected to a treatment with an ion exchanger mixture consisting of 40 to 70 percent clinoptilolite, 30 to 15 percent anion exchanger and 30 to 15 percent cation exchanger, the two latter being of cellulose type.

The negative groups of the cation exchanger can be groups of phosphate, carboxylate or hydroxide and the positive groups of the anion exchanger can be quaternary amino groups or imino groups.

The treatment with the ion exchanger mixture can take place 0.5 to 2 times an hour and the flow rate through the ion exchanger is preferably 3 to 12 m/h.

The present invention relates also to an ion exchanger mixture for purification of water for fish-breeding, which mixture comprises 40 to 70 percent clinoptilolite, 30 to 15 percent anion exchanger and 30 to 15 percent cation exchanger, the two latter being of cellulose type.

The present invention is described in detail here below:

In a breeding container with a water content of 1 m$^3$ salmon from the atlantic was bred from a weight of about 40 gram (so called salmon-fry) to a weight of 198 gram within a period of 2.5 months. The final fish density was 2.1 percent.

The water was purified by circulating it through 150 l of an ion exchanger mixture of 40 percent clinoptilolite and each 30 percent of anion and cation exchanger of the cellulose type. The water was circulated through the ion exchanger mixture with a flow rate of 1 m$^3$/h and the diameter of the mixture was chosen to fit a rate of 8 m/h through the ion exchanger. This means a cross section area of one eighth m$^2$. To avoid the ion exchanger mixture acting as a filter for particles suspended in the water a sedimentation tank was adapted before the ion exchanger mixture. The particles in question being rather coarse a dwelling time of 20 minutes in the sedimentation tank was sufficient.

Besides this purification of the water a continuous filtration of the water through a sand filter was accomplished. The flow rate through the sand filter was 250 l/h, i.e. the complete water content of the breeding tank passed through the filter every four hours. A slower filtration is possible if a good sedimentation is introduced before the treatment with ion exchanger mixture and before the sand filter.

For aeration of the water and to remove produced carbonic acid and furthermore especially for maintaining the oxygen-saturation at least at 90 percent, an aeration of the water in a separate circuit was carried out, in which circuit the water passed through an aeration tank 6 times per hour. An air volume corresponding to 50 times of the theoretical oxygen demand of the fishes was blown into the aeration tank.

The fish-breeding described above was repeated with the same procedures for purification of the water but in brackish water with a salt content of up to 1.2 percent instead of fresh water. Surprisingly the purification of the water showed even in these cases to be quite satisfactory to achieve a good growth of the fish. The explanation hereto ought to be that there is a biological activity inside the ion exchanger mixture where the composition of the ions is different, as nitrification and denitrification normally takes place at an essentially slower rate in 1.2 percent salt content compared with fresh water.

Instead of the above ion exchanger mixture, a mixture consisting of 50 percent clinoptilolite, 30 percent cation exchanger and 20 percent anion exchanger was used, the two latter being of cellulose type. With this ion exchanger mixture ammonia/ammonium was removed, while the concentration of nitrate increased during the first two days, whereafter an equilibrium was reached between denitrification and formation of nitrate, to remain at a level equivalent to 4 to 5 mg per liter $NO_3^-$—N. The procedure above was repeated, but with pure clinoptilolite instead of the ion exchanger mixture. Even here ammonia/ammonium was removed, while the concentration of nitrate increased with 1.8 to 2.2 mg per liter and day, which implies that 80 to 90 percent of supplied nitrogen remained as nitrate. In the water "only" purified with clinoptilolite ion exchanger the concentration of $NO_3^-$—N was over 50 mg per liter.

During microbiological investigations of ion exchanger mixtures according to the invention it has surprisingly turned out that inside the mixture a nitrification and thereafter a denitrification takes place. The ion exchanger mixture hence functions as a biological bed in which the nutrition for the microorganisms are concentrated in such way that compared with mechanical-biological purification a much shorter stay is achieved and hence a much smaller need of space. In the ion exchanger mixture the diluted sewage water is hence concentrated, whereafter a biological purification, essentially taking place as a reaction of the first degree, occurs much faster in the mixture.

Analysises show that there occurs a concentration in the ion exchanger mixture of ammonia/ammonium up to 1.000 mg per liter and of $BOD_5$ up to almost 1.000 mg per liter. This concerns concentrations much higher than in community sewage water, where the corresponding concentration is about 30 mg and 200 mg per liter, respectively.

When a mixture of 40 percent clinoptilolite and each 30 percent of anion and cation exchanger of the cellulose type is used, and this to an amount in cubic meter equivalent to one third of the daily food ration (expressed in kg), this ion exchanger mixture helds a concentration of about 2 to 5 mg per liter of $BOD_5$ and about 0.4 to 0.8 mg per liter of ammonia/ammonium at a pH of 7.3.

I claim:
1. Water purification process comprising:
   filtering the water through sand;
   oxygenating said water;
   treating said water by exposure to an ion exchange mixture consisting of 40-70 percent clinoptilolite, 30-15 percent anion exchanger and 30-15 percent cation exchanger;
   wherein said anion and cation exchangers are of the cellulose type.
2. A method according to claim 1, characterized in that the water is treated with the ion exchanger mixture 0.5 to 2 times per hour and with a flow rate through the ion exchanger of 3 to 12 meter per hour.
3. Process as in claim 1 wherein said water is subjected to sedimentation prior to treatment of said water with said ion exchange mixture.
4. Ion exchanger mixture for purification of water for fish-breeding, characterized in that it comprises 40 to 70 percent clinoptilolite, 30 to 15 percent anion exchanger and 30 to 15 percent cation exchanger, the two last mentioned being of cellulose type.
5. Ion exchanger mixture according to claim 4, characterized in that it comprises 40 percent clinoptilolite, 30 percent anion exchanger and 30 percent cation exchanger.

* * * * *